United States Patent [19]

Molvar

[11] 4,224,158
[45] Sep. 23, 1980

[54] AERATION SYSTEM AND METHOD WITH TAPERED NOZZLE

[75] Inventor: Allen E. Molvar, Barrington, R.I.

[73] Assignee: Clevepak Corporation, White Plains, N.Y.

[21] Appl. No.: 953,212

[22] Filed: Oct. 20, 1978

Related U.S. Application Data

[63] Continuation-in-part of Ser. No. 863,588, Dec. 22, 1977, Pat. No. 4,157,304, and Ser. No. 863,587, Dec. 22, 1977, Pat. No. 4,152,259.

[30] Foreign Application Priority Data

Nov. 22, 1977 [JP] Japan .................................. 52-40554
Nov. 22, 1977 [JP] Japan .................................. 52-40555

[51] Int. Cl.$^2$ ............................ B01F 3/04; C02C 1/08
[52] U.S. Cl. ................................ 210/220; 210/242 A; 261/76; 261/DIG. 75
[58] Field of Search .................... 210/14, 15, 60, 63 R, 210/194, 220, 221 R, 242 A; 239/428.5, 430; 261/29, 76, 79 A, DIG. 75, DIG. 78; 366/167, 174

[56] References Cited

U.S. PATENT DOCUMENTS

| | | | |
|---|---|---|---|
| 2,447,123 | 8/1948 | Jones | 239/430 X |
| 2,548,725 | 4/1951 | Justis | 239/428.5 X |
| 3,365,178 | 1/1968 | Bood | 261/DIG. 75 |
| 3,430,823 | 3/1969 | Hunsaker | 239/428.5 X |
| 3,653,641 | 4/1972 | Eron | 210/242 A X |
| 3,671,022 | 6/1972 | Laird et al. | 261/DIG. 75 |
| 3,761,065 | 9/1973 | Rich et al. | 261/76 |
| 3,954,921 | 5/1976 | Yoshida et al. | 261/DIG. 75 |
| 3,957,633 | 5/1976 | Gatti et al. | 261/DIG. 75 |
| 4,019,983 | 4/1977 | Mandt | 261/DIG. 75 |
| 4,044,079 | 8/1977 | Tveit | 261/DIG. 75 |
| 4,112,025 | 9/1978 | Wilson et al. | 261/29 |

FOREIGN PATENT DOCUMENTS 1517502 11/1970 Fed. Rep. of Germany ... 261/DIG. 75

*Primary Examiner*—Robert H. Spitzer
*Attorney, Agent, or Firm*—Cushman, Darby & Cushman

[57] ABSTRACT

An improved system for mixing gas with waste water in which the water is pumped through a plurality of mixing chambers into which the gas is injected at a step region to form parallel streams of gas and water. An extending chamber contains the parallel streams as the interface between them becomes unstable, breaks down creating vortices and produces tiny bubbles which mix with the water. The extending chamber is divided into two sections with at least the section remote from the step surface tapered inwardly at a rate of 11°–22° to permit operation at higher air flow rates without blowing the bubble forming vortices out of the chamber.

7 Claims, 3 Drawing Figures

AERATION SYSTEM AND METHOD WITH TAPERED NOZZLE

BRIEF DESCRIPTION AND SUMMARY OF THE INVENTION

The present application is a continuation-in-part of Ser. No. 863,588 filed Dec. 22, 1977 now U.S. Pat. No. 4,157,304 and 863,587 filed Dec. 22, 1977 now U.S. Pat. No. 4,152,259.

The invention relates to an improved method, and submerged system for efficiently mixing gas with waste water.

Industrial waste, sewage and the like are commonly purified by pumping the liquid into a large pond, tank or basin where a bacteria population consumes the inorganic and organic material. Because the dissolved oxygen in the waste water is usually insufficient to support the required population of bacteria, the water must be aerated. This can be done with a surface aerating machine which has beaters extending into the waste water from above the water surface to agitate the water and incorporate air. Alternatively, air can be diffused through the bottom of the basin, for example, through a porous medium. Surface aerators are not efficient and cause certain mechanical problems. The energy loss of diffusing air is also great and a diffused system is not suitable for installation in an existing pond.

The waste water can also be aerated by pumping through submerged tubes with Venturi openings through which air is drawn or pumped into the tubes to create turbulent mixing.

The present invention relates to an improved system for mixing a gas such as oxygen or air with waste water in a body. A plurality of mixing chambers are disposed below the surface of the waste water and the water in the body is pumped from an inlet to an outlet. A suitable gas, such as oxygen or air containing oxygen, is injected into each of the mixing chambers at a step region to form parallel streams of air and water in an extending chamber. As the two streams move down the extending chamber, the interface between the two streams becomes unstable and waves form which attach to the sides of the chamber. This causes large frictional stresses, creating tiny bubbles which mix with the water. Since the water and air essentially flow in the same direction, no energy is wasted in turbulence and the system is energy efficient. Systems of this type are described and claimed in co-pending application Ser. No. 598,871, filed July 24, 1975, now abandoned.

According to an improved aspect of this system, the extending chamber is inwardly tapered in the downstream direction to ensure that the vortices created by the mixing do not extend out of the chamber which would reduce the efficiency of the mixing. Thus, the device operates at a high and constant efficiency over a wide range of air flow rates. Further, helical vanes (not shown) can be provided in the injection passages for the gas to create greater wave generating conditions which extend the operating range of the device to greater air flow rates.

The extending chamber is divided into a first section extending from the step region and a second inwardly tapered section extending downwardly from the first section. This second section is shorter than the first and tapered at a rate greater than any taper of the first section. It is desired that both sections be tapered, but if only the second section is tapered the results are satisfactory, and the cost of manufacture is less when machining techniques rather than molding techniques are used. However, when molding in plastic, tapering of the first section aids in removal from the mold. The first section is preferably non-diverging. The length of the first section along the flow direction is preferably between one and ten times the diameter at the step region and the length of the second section along the flow direction is preferably between one-eighth and one times the diameter at the intersection of the sections. The taper of the second section is preferably between 11° and 22°.

This system can be quickly and easily installed in any existing aeration pond or tank without the need for the system to be shut down for an extended period and without the need for the pond or tank to be drained, a project which is difficult or impossible to accomplish in most instances. The system can, in fact, be installed and operating within a few minutes. In comparison with diffused air type devices and surface aeration systems, the energy required to incorporate a given amount of oxygen into the water is much less. Because little energy is wasted in turbulent mixing, the present invention is more energy efficient than are Venturi, jet or impingement type systems which depend on turbulent mixing. Further, the bubbles which are produced are tiny, thus creating a good environment for effective use of oxygen by the bacteria within the pond or basin. Many of the other disadvantages of surface aerators and diffusion type devices are also avoided.

Other objects and purposes of the invention will be clear from the following detailed description of the drawings.

Figure 1:
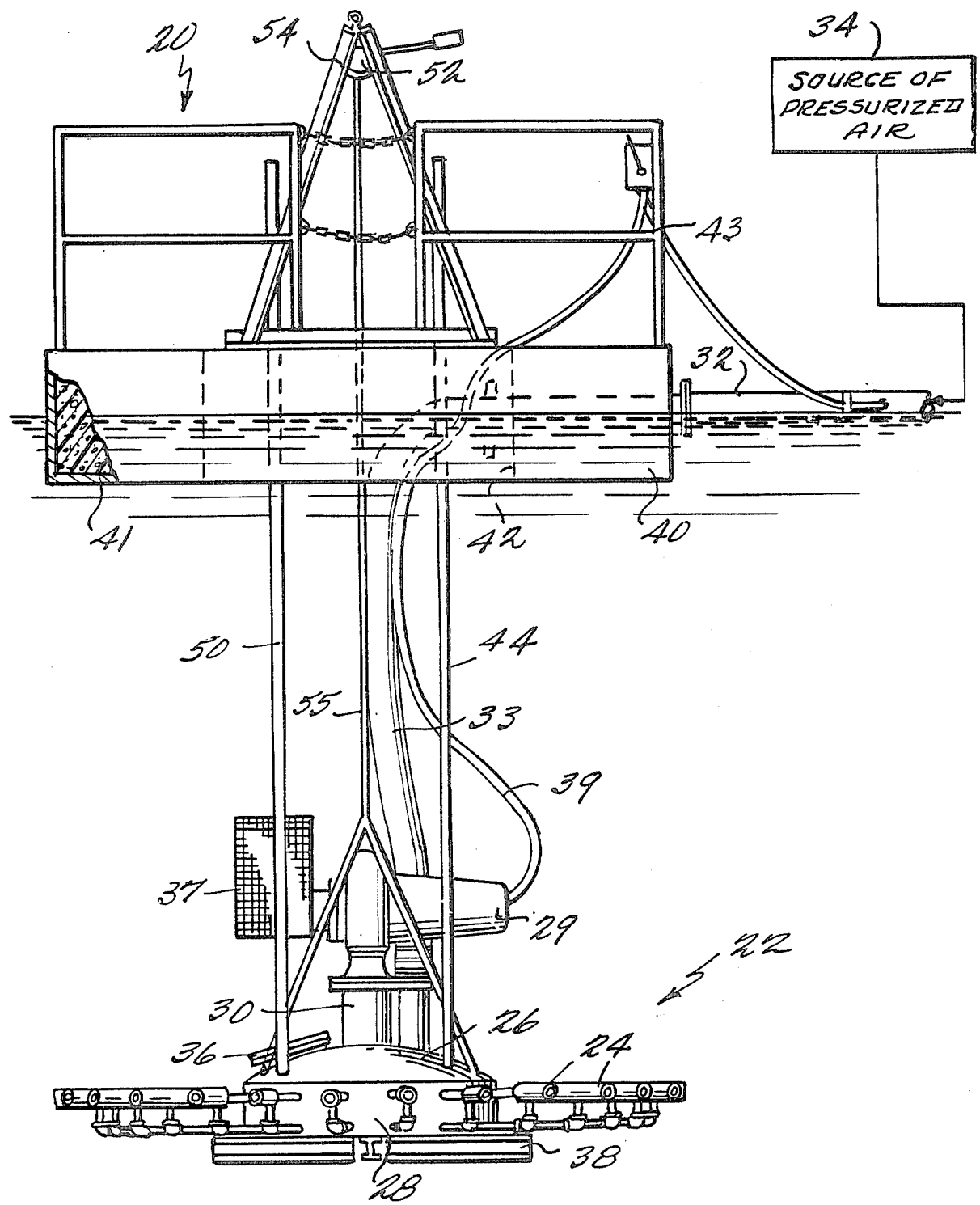
FIG. 1 shows a schematic side view of the system of the present invention in use.
Figure 2:
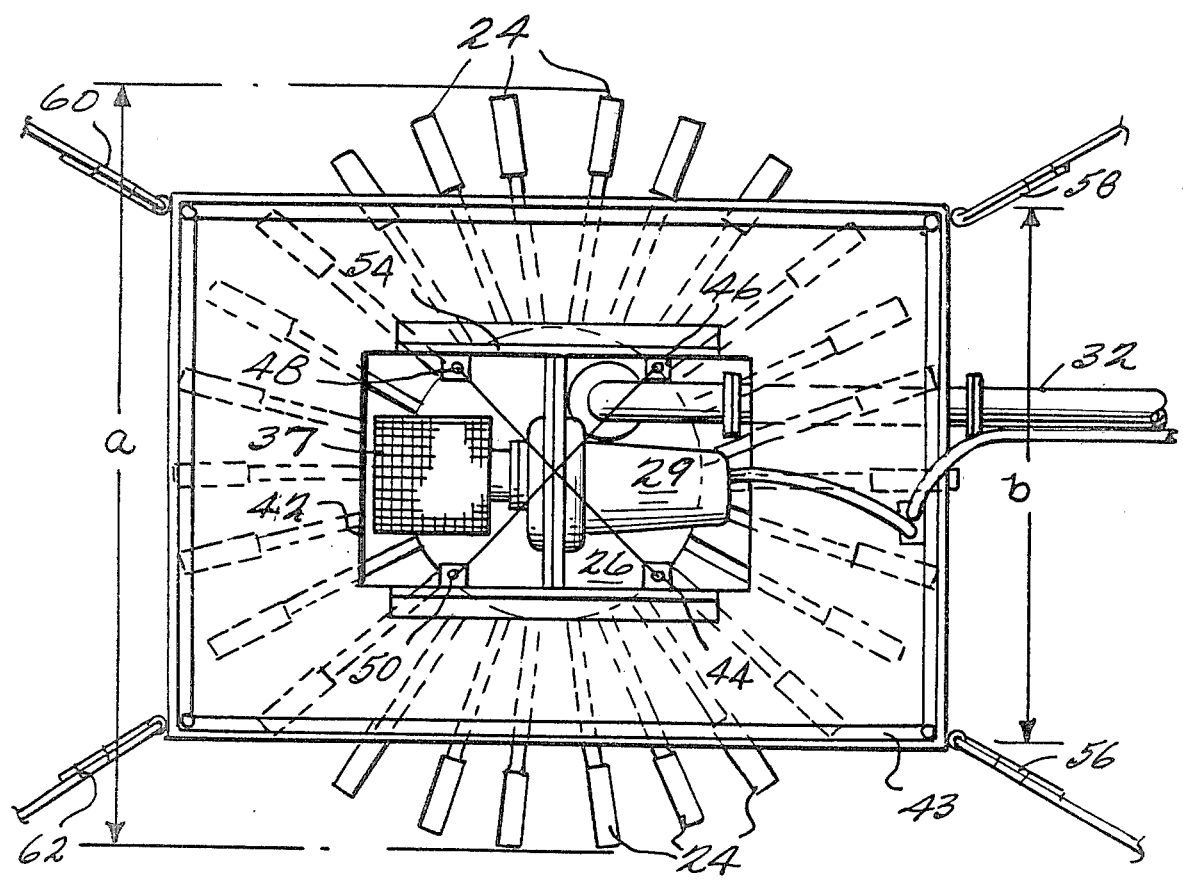
FIG. 2 shows a planar view of the system of FIG. 1.

DETAILED DESCRIPTION OF THE DRAWINGS:

Reference is now made to FIGS. 1 and 2 which illustrate a preferred embodiment of the invention. This embodiment is disclosed and claimed in a co-pending application entitled WASTE TREATMENT APPARATUS Dkt. 36, Ser. No. 953,215 filed Oct. 20, 1978. Floating platform 20 is adjustably suspended from aeration device 22, in a body of waste water. Aeration device 22 is comprised of a plurality of jet aerators 24, for example, twenty-six jet aerators radially extending outward from a water manifold 26 having a dome upper surface with an access port 36. The dome surface withstands the upward pressure of the water and supports the heavy pump above it. A bottom bracket 38 allows device 22 to sit on the bottom of the body if desired. Access port 36 allows epoxy coating the interior surfaces of the dome during fabrication and removal of tools and debris after welding.

Water is pumped radially outward through an internal passage in each of these jet aerators. Air from a second manifold 28 disposed below manifold 26 and separated therefrom by a suitable partition of diaphragm (not shown) is injected into each of the nozzles to form parallel water and air streams. The interface between these two streams in the nozzle passage becomes unstable, creating vortices and forming tiny bubbles which are intimately and efficiently mixed with the water being pumped through the passage. The operation of this type of jet aerator and detailed structure thereof are further described in U.S. Patent application Ser. No. 863,588, filed Dec. 22, 1977, now U.S. Pat. No. 4,157,304, and Ser. No. 863,587, filed Dec. 22, 1977, now U.S. Pat. No. 4,152,259, both the invention of the present applicant and in Ser. No. 598,871, filed July 24, 1975, now abandoned, the co-invention of the present applicant and a second inventor. The disclosure of each of these applications is hereby incorporated by reference into the present application.

Water is supplied to the manifold by a conventional submersible pump 29, for example, a 14 horsepower submersible pump, via a neck portion conduit 30. Screen 37 covers the pump inlet and filters debris in the body. Electric line 39 powers pump 29. Air is supplied to the manifold 28 via conduit 32 from a source of pressurized air shown schematically as source 34 and located above the surface of the water, for example, on land.

Platform 20 is designed and includes a number of features which make the platform a stable, desirable, and effective support for suspending an aeration device. Base 40 provides the positive buoyancy required to support the aeration device 22. Base 40 is preferably closed on the top, bottom and all sides and contains conventional foam material 41, part of which can be seen in the partially broken away part of FIG. 1. Since the bottom is closed, the waste water cannot break down foam material 41. Any suitable foam can be employed. Safety rails 43 extend about the top surface of base 40. Base 40 can be made of any suitable material, and fibreglass over a metal frame has been found to be particularly satisfactory.

Conduit 32 extends through the interior of hollow base 40 between peripheral surface and the central opening and is a structural part of base 40. Conduit 32 is fibreglass sealed where it enters and leaves the interior of base 40, and is preferably arranged so that its center line is located at the water line. Conduit 32 connects to flexible hose 33 which in turn connects to manifold 28. Thus, the conduit 32 exerts no force on the platform, and it functions like an outrigger to increase the stability of the platform.

Base 40 is provided with a rectangular central opening 42 exposing the waste water surface to the atmosphere. This opening is desirable to prevent rolling and pitching of the platform during operation and particularly during back-flush operation in which considerable flow of water and entrained air in an upward directly occurs. In addition, the platform is preferably dimensioned so that its smallest dimension is at least equal to the nozzle to nozzle dimension of the aeration unit. In order to provide stability, the cross-sectional area of opening 42 must be as large as the intake area of the pump. A platform so dimensioned provides an effective aeration pattern since some of the aerated stream is trapped under the floating platform as small bubbles to cap and increase residence time and absorption. However, if the aeration unit is too small, then large pockets of air tend to form underneath the platform, reducing absorption and decreasing efficiency. It has been found that this is avoided if the distance a from the outlets of the most separated nozzles is at least about equal to or greater than the smallest horizontal platform dimensions b. The distance a can be slightly smaller than b, perhaps a few feet smaller, when higher jet velocities are used. In the illustrated embodiment the distance a is considerably larger than distance b.

Aeration unit 22 is connected to the platform by four stabilizing bars 44, 46, 48, and 50 which are welded to the dome upper surface of manifold 26 and can be readily adjusted on the platform to move the aeration unit in a vertical direction. Bars 44, 46, 48 and 50 prevent rotation rolling and pitching. At least two bars are needed and four are preferred. Winch 52 is suspended from an A-frame 54 made of aluminum and connected to the dome 26 by capable 55 at four separated locations which are joined above the center of gravity of the submerged unit as shown. The A-frame retrieval winch 52 allows aeration device 22 to be raised high enough for maintenance. Thus, to move the aeration unit up and down it is only necessary to use the winch. Guy wires 56, 58, 60 and 62 attach floating platform 20 to solid supports for wind stabilization (not shown).

Figure 3:
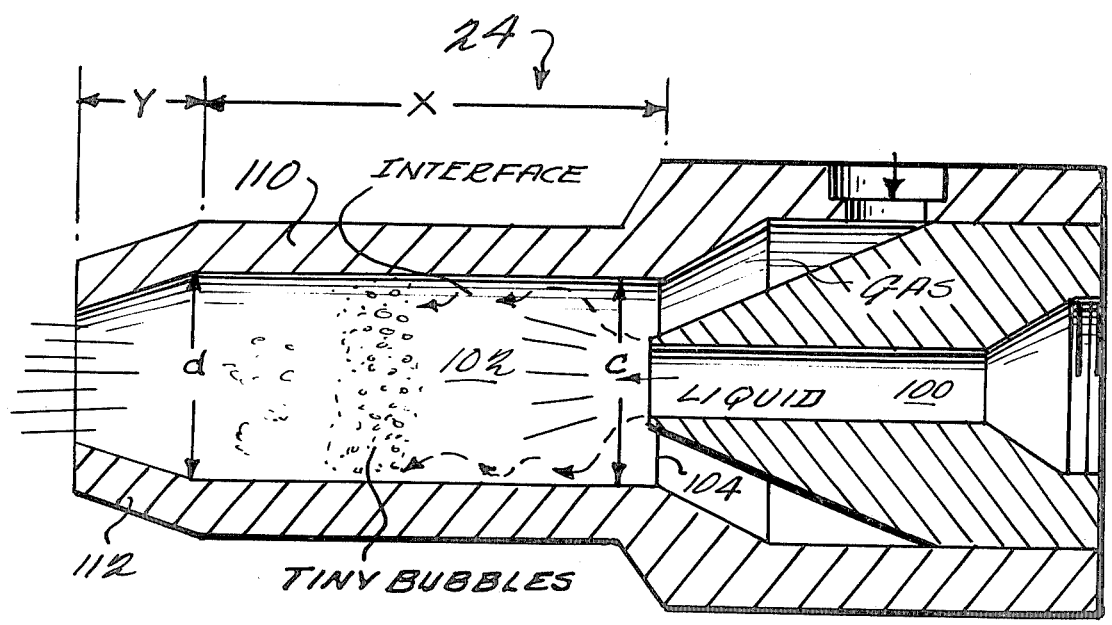
FIG. 3 shows a sectional view of a mixing chamber of the present invention without helical vanes.

FIG. 3 illustrates one device 24 in detail. Waste water flows from the inlet through passage 100 into the extending chamber 102. At the entry of passage 100 into chamber 102, a step region 104 is provided which includes gas passages. The passages inject gas at an angle between roughly 11° and 22½°.

Thus, two parallel streams of gas and waste water are created as shown in FIG. 3. As the streams move along the chamber 102, the friction between them causes waves to form and air thus trapped in the waves to disperse into tiny bubbles. Since the air and gas streams move in the same direction, effective mixing is achieved at minimum energy consumption.

The extending chamber is divided into first section 110 and second section 112. Section 112 is tapered between 11° and 22°, whereas in the illustrated embodiment, section 110 is a straight cylinder. The length x of the first section is between one and ten times the distance c and the length y of the second section, between one-eighth and one times the distance d. If the length y is less than about one-eighth, circulating eddies are created which decrease efficiency. As the length y increases greater than about one times, efficiency decreases. If the length x is less than one, then the vortices tend to blow out of the tube. If the length x is greater than ten, coalescence results and efficiency declines.

Many changes and modifications in the above-described embodiments can be carried out without departing from the scope of the present invention, that scope being intended to be limited only by the scope of the appended claims.

What is claimed is:

1. A system for aerating waste water in a body of waste water comprising:
   at least one mixing chamber adapted for immersion in said body for providing a waste water passage, including:
   an extending chamber;
   a liquid passage for guiding waste water flow into said extending chamber, the cross-sectional area of the liquid passage at the entry to said extending chamber being less than the cross-sectional area of said extending chamber at that entry so as to form a step region, and said extending chamber including a first section extending from said step region and a second inwardly tapered section extending from said first section, shorter than said first section along the direction of water flow and tapering inwardly at a rate greater than any inward taper of said first section so as to maintain mixing within said extending chamber over a wide range of gas flow rates; and means defining at least one gas passage terminating in said step region for injecting gas into said extending chamber, to form parallel gas and water streams, said extending chamber extending downstream from said gas passage for confining flow of the parallel gas and water streams for a distance until the interface between said streams becomes unstable in said extending chamber and vortices are tripped to produce gas bubbles which are mixed with the water stream;

means for pumping said waste water through said at least one mixing chamber;

means for mounting said mixing chamber below the surface of said body of water; and means for injecting an aerating gas into waste water within said mixing chamber.

2. A system as in claim 1, wherein said sections have circular cross-sections at their intersection and at said step region and the length of said first section is between 1 and 10 times the diameter at said step region and the length of said second section is between one-eighth and one times the diameter at said intersection.

3. A system as in claims 1 or 2, wherein the taper of said second section is between 11° and 22°.

4. A system as in claims 1 or 2, wherein said first section is non-diverging.

5. A system as in claim 4, wherein said first section is cylindrical.

6. A system as in claims 1 or 2, including a plurality of said mixing chambers.

7. A system as in claim 1, wherein said pumping means includes a water manifold, said extending chambers extending radially outward from said water manifold and a pump mounted about said water manifold in said body and connected to said water manifold and wherein said gas injecting means includes a conduit adapted for connection to a source of gas and a gas manifold connected to said conduit.

* * * * *